June 17, 1952 — J. THÉVENAZ — 2,601,181
DEVICE FOR DRIVING A FILM IN A MULTIFILM
CINEMATOGRAPHIC PROJECTOR
Filed June 21, 1950

INVENTOR
Jean Thevenaz.

BY

ATTORNEY

UNITED STATES PATENT OFFICE 2,601,181

DEVICE FOR DRIVING A FILM IN A MULTI-FILM CINEMATOGRAPHIC PROJECTOR

Jean Thévenaz, Yverdon, Switzerland, assignor to Paillard S. A., a corporation of Switzerland Application June 21, 1950, Serial No. 169,365
In Switzerland June 30, 1949

2 Claims. (Cl. 88—18.4)

Known multifilm cinematographic projectors are in general only modified monofilm projectors. However there are certain advantages in constructing a multifilm projector particularly one having an optical system for each film. This arrangement permits of having an optical system and a cam-claw system particularly adapted for each size. Further, as the feed members are secured to two ends of common driving shafts, the loading of the films as also the change from one size to another are operations which are both easy and rapid.

But this type of projector naturally results in new problems, in particular that of the control of two independent claws.

The present invention has for its object a device for driving a film in a multifilm cinematographic projector provided with at least two control cams secured to the same driving shaft, each of the cams being located in a plane parallel to that of the film and actuating an independent claw.

Figure 1:
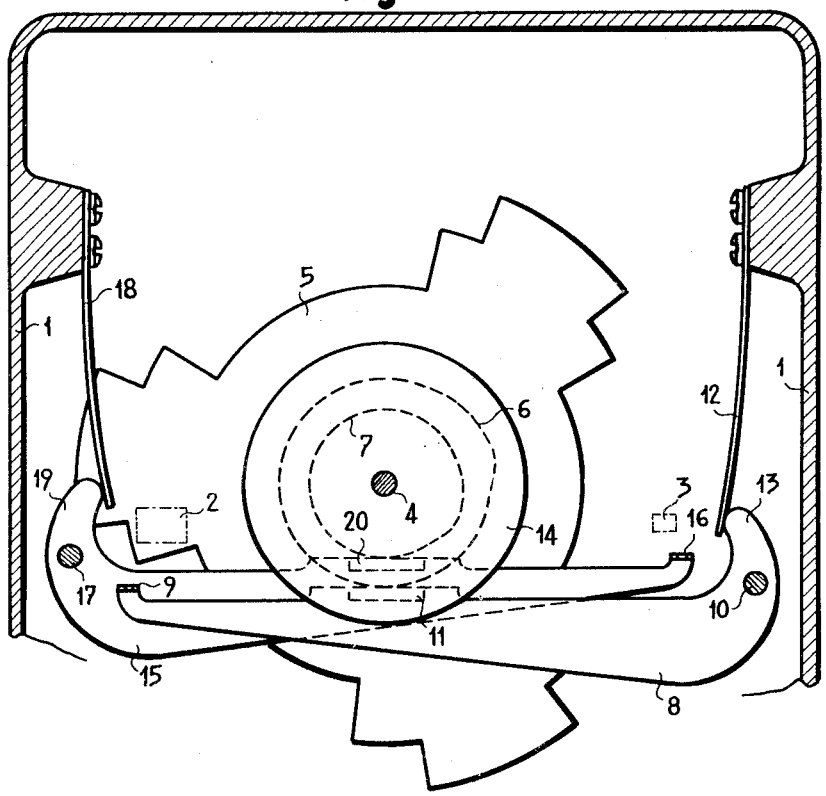
Figure 2:
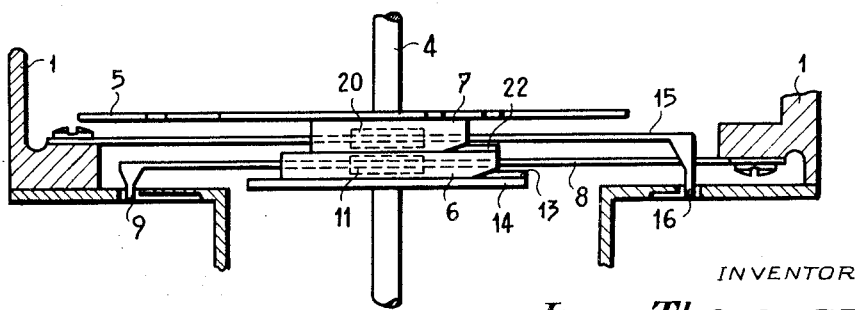
Figure 2:
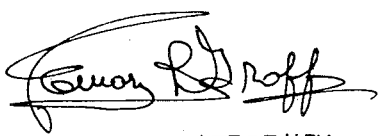

One form of construction of the subject of the invention is shown by way of example in the accompanying drawings, wherein:

Fig. 1 is a front elevation.
Fig. 2 is a plan view.

In the drawing 1 indicates the side walls of the projector which is provided on each of its two sides with an optical system suitable for the projection of a film of a different size for each optical system. In the example shown, the position of the window 2 on the left for projection of a 16 mm. film and window 3 on the right for projection of an 8 mm. film are indicated in broken lines.

The driving device for the two films of different sizes passing on front of the two said optical systems is the following: a driving shaft 4 located in the central plane between the walls 1 carries on the one hand a shutter 5, common to the two optical systems, and two cams 6 and 7 located in a plane parallel to that of the film.

The feed mechanism for the 16 mm. film is constituted by a lever 8 having at its end a claw 9 and pivoting about a pivot 10. The lever 8, by means of a shoe 11, bears against the cam 6. A blade spring 12 bears against the bend end 13 of the lever 8 in such a manner as to hold the latter always in contact with the cam 6.

The cam 6 imparts to the lever 8 and to the claw 9 a downward movement when the claw 9 engages with a perforation of the film, then an ascending movement when the claw is disengaged from the film. The movement of penetration and disengagement of the claw 9 into and from the film is produced by the lateral face 13 of a third cam 14 mounted on the shaft 4 and which bears against the lever 8, the latter operating as a spring blade.

The feed mechanism for the 8 mm. film is similar to the preceding one. A lever 15 having at its end a claw 16, pivots about a pivot 17. A spring blade 18 bears against the bend end 19 of the lever 15 in such a manner as to maintain contact between a shoe 20 of the said lever and the cam 7.

The cam 7 produces the downward and upward movement of the lever 15, and therefore of the claw 16. Further the face 22 of the cam 6 bears against the lever 15 which operates like a blade spring thus producing the movement of penetration and disengagement of the claw 16 into and from the perforations of the film.

The two projection windows 2 and 3 may naturally be juxtaposed, in which case the two claws 9 and 16 are located on the same side of the driving shaft of the cams.

I claim:

1. In a multifilm cinema projector, the combination, comprising, a frame, a pair of levers each fulcrumed on the frame and resiliently bendable in the direction of the fulcrum axis, a claw at the end of each lever adapted to enter the perforation of a film, a rotatable shaft, a first pair of cams each constituted by the periphery of a disc and rigid with the shaft and each engaging one edge of a related lever to swing the same about its fulcrum, a second pair of cams each engaging an adjacent side of a related lever and bending same to move its claw thereof substantially parallel to the lever fulcrum, one of the second pair of cams constituted by the lateral face of one of the discs and the second one of the second pair of cams constituted by the lateral face of a third disc, and a pair of springs reacting against the frame and each urging a lever against one of the first pair of cams.

2. In a multifilm cinema projector, the combination, comprising, a frame, a pair of levers each fulcrumed at one end to the frame and resiliently bendable in the direction of the fulcrum axis, a claw at the end of each lever opposite its fulcrum, a rotatable shaft arranged between the fulcrum end and the claw end of each lever, a first pair of cams each constituted by the periphery of a disc rigid with the shaft and each engaging one edge of a related lever to swing the same about its fulcrum, a second pair of cams on said shaft each engaging an adjacent side of a related lever and bending same to move its claw thereof substantially parallel to the lever fulcrum, one of said second pair of cams constituted by the lateral face of one of the discs of said first pair of cams and the second one of said second pair of cams constituted by the lateral face of a third disc.

JEAN THÉVENAZ.

REFERENCES CITED

The following references are of record in the file of this patent:

UNITED STATES PATENTS

| Number | Name | Date |
| --- | --- | --- |
| 2,484,348 | Kellogg | Oct. 11, 1949 |
| 2,521,957 | Wittel | Sept. 12, 1950 |

FOREIGN PATENTS

| Number | Country | Date |
| --- | --- | --- |
| 678,243 | France | Dec. 23, 1929 |